(12) United States Patent
Chijiwa

(10) Patent No.: US 9,366,798 B2
(45) Date of Patent: Jun. 14, 2016

(54) LIGHT GUIDE PLATE WITH SHARP-EDGED PRISMS AND SIDE-EDGE TYPE SURFACE-EMISSION OPTICAL APPARATUS INCLUDING THE SAME

(71) Applicant: Stanley Electric Co., Ltd., Tokyo (JP)

(72) Inventor: Kazumi Chijiwa, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 42 days.

(21) Appl. No.: 14/315,592

(22) Filed: Jun. 26, 2014

(65) Prior Publication Data

US 2015/0009711 A1    Jan. 8, 2015

(30) Foreign Application Priority Data

Jul. 3, 2013    (JP) .................................. 2013-139561

(51) Int. Cl.
*F21V 8/00* (2006.01)

(52) U.S. Cl.
CPC .................................... *G02B 6/0038* (2013.01)

(58) Field of Classification Search
CPC ... G02B 6/0035; G02B 6/0036; G02B 6/0038
See application file for complete search history.

(56) References Cited

U.S. PATENT DOCUMENTS

2009/0086509 A1    4/2009 Omori et al.
2014/0063414 A1*   3/2014 Kim ..................... G02B 6/0036
                                                      349/65

FOREIGN PATENT DOCUMENTS

JP           2009-81094 A    4/2009

* cited by examiner

*Primary Examiner* — Anne Hines
(74) *Attorney, Agent, or Firm* — Kenealy Vaidya LLP

(57) ABSTRACT

In a light guide plate having a light incident surface, a light distributing control surface perpendicular to the light incident surface and a light emitting surface opposing the light distributing control surface, a flat mirror-finish portion is provided on a first area of the light distributing control surface, and a prism sequence is provided on a second area of the light distributing control surface where the flat mirror-finish portion is not provided. The prism sequence is protruded with respect to the flat mirror-finish portion. Each prism of the prism sequence has a rising sloped surface opposing the light incident surface, a first falling sloped surface connected to the rising sloped surface, and a second falling sloped surface connected to the first falling sloped surface. A slope of the first falling sloped surface is larger than a slope of the second falling sloped surface.

12 Claims, 20 Drawing Sheets

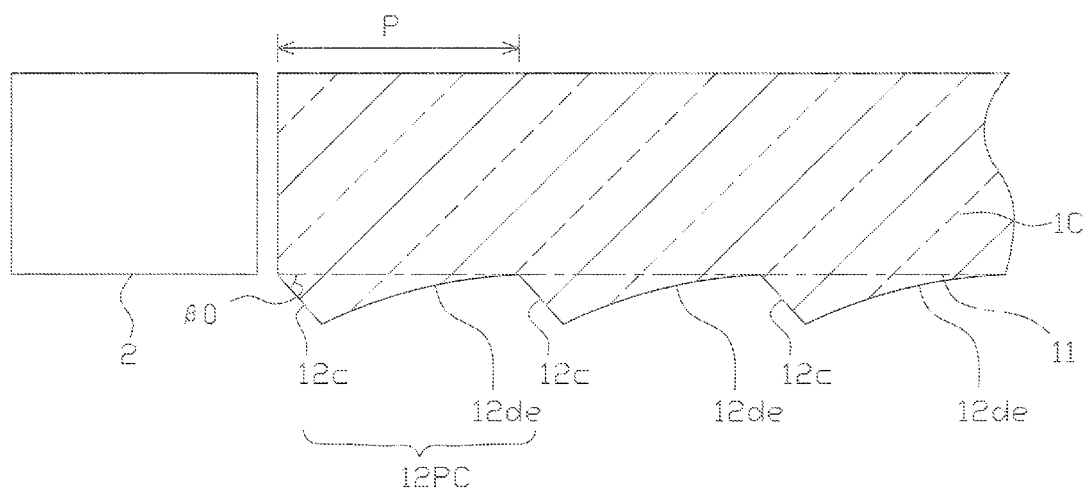

US 9,366,798 B2

LIGHT GUIDE PLATE WITH SHARP-EDGED PRISMS AND SIDE-EDGE TYPE SURFACE-EMISSION OPTICAL APPARATUS INCLUDING THE SAME

This application claims the priority benefit under 35 U.S.C. §119 to Japanese Patent Application No. JP2013-139561 filed on Jul. 3, 2013, which disclosure is hereby incorporated in its entirety by reference.

BACKGROUND

1. Field

The presently disclosed subject matter relates to a light guide plate and a side-edge type surface-emission optical apparatus including the light guide plate used in a liquid crystal display (LCD) unit.

2. Description of the Related Art

Side-edge type surface-emission optical apparatuses used for LCD units are advantageous in terms of their thin and light structures.

FIG. 15A is a plan view illustrating a prior art side-edge type surface-emission optical apparatus, and FIGS. 15B and 15C are cross sectional views of the side-edge type surface-emission optical apparatus of FIG. 15A taken along the lines B-B and C-C, respectively, in FIG. 15A (see: FIGS. 1(a) and 9 of JP2009-81094A & US2009/0086509A1).

In FIGS. 15A, 15B and 15C, the side-edge type surface-emission optical apparatus is constructed by a light guide plate 1 made of transparent material such as acryl resin or polycarbonate resin with a light incident surface $S_{in}$, a light distributing control surface $S_{cont}$ perpendicular to the light incident surface $S_{in}$ and a light emitting surface $S_{out}$ opposing the light distributing control surface $S_{cont}$. A light source 2 formed by a plurality of light emitting diodes (LEDs) is disposed on the light incident surface $S_{in}$. Also, a prism sheet 3, which is illustrated only in FIG. 15C, is disposed on the light emitting surface $S_{out}$ of the light guide plate 1, and a Liquid crystal display (LCD) panel (not shown) is disposed outside of the prism sheet 3. The prism sheet 3 is a single-face-deformed triangular prism sheet; however, the prism sheet 3 may have a cross section such as a curved cross section other than a triangular cross section. Further, a flexible reflective sheet 4, which is illustrated only in FIGS. 15B and 15C, is disposed on the light distributing control surface $S_{cont}$. The flexible reflective sheet 4 is operated to return light leaked from the light distributing control surface $S_{cont}$ thereto, thus enhancing the luminous intensity. In FIGS. 15B and 15C, note that the flexible reflective sheet 4 is apart from the light guide plate 1; however, the flexible reflective sheet 4 is actually in close proximity to the light distributing control surface $S_{cont}$ of the light guide plate 1.

As illustrated in FIG. 15A, a plurality of flat mirror-finish portions 11 are provided on the light distributing control surface $S_{cont}$ of the light guide plate 1 and extend from the light incident surface $S_{in}$. The flat mirror-finish portions 11 serve as means for spreading light to the inner part of the light guide plate 1. In this case, the farther from the light incident surface $S_{in}$ a location of the flat mirror-finish portions 11, the smaller the width of the flat mirror-finish portions 11 at that location. A plurality of triangular prism sequences 12 are provided on areas of the light distributing control surface $S_{cont}$ of the light guide plate 1 where the flat mirror-finish portions 11 are not provided. The triangular prism sequences 12 are protruded with respect to the flat mirror-finish portions 11. Each of the triangular prism sequences 12 includes a plurality of equidistantly-arranged triangular prisms for bending the path of light. In this case, the farther from the light incident surface $S_{in}$ a location of the triangular prism sequences 12, the larger the width of the triangular prism sequences 12 at that location. Thus, much more light is totally reflected by the triangular prism sequences 12, to realize a uniform surface emission.

In FIG. 16, which is a partly-enlarged cross sectional view of the light guide plate 1 of FIGS. 15A, 15B and 15C, each prism 12P of the triangular prism sequences 12 per pitch P0 has an asymmetrical structure formed by a straight-type rising sloped surface 12a whose slope angle is defined by α0, and a straight-type falling sloped surface 12b whose slope angle is defined by α1 (≠α0). Particularly, the falling sloped surface 12b carries out a light distributing control to bend the path of light. In order to enhance the luminous intensity of a surface-emission along the normal direction to the prism sheet 3, the slope angle α1 of the falling sloped surface 12b with respect to the flat mirror-finish portions 11 is preferably as small as possible, for example.

$$4°≤α1≤5°$$

As a result, spatial light distribution characteristics of the light guide plate 1 with a narrow full-width at half maximum as shown in FIG. 17 can be realized. In FIG. 17, note that the full-width at half maximum is 25° with a range from 55° to 80°. Also, the slope angle α0 of the rising sloped surface 12a with respect to the flat mirror-finish portions 11 is $$15°≤α0≤90°$$

Thus, light distribution characteristics of the prism sheet 3 as shown in FIG. 18 with a high emission along the normal direction to the prism sheet 3 can be realized.

In the side-edge type surface-emission optical apparatus of FIGS. 15A, 15B and 15C, in order to further enhance the luminous intensity along the normal direction to the prism sheet 3, the slope angle α1 of the falling sloped surface 12b with respect to the flat mirror-finish portions 11 is preferably smaller than 4". As a result, the falling sloped surface 12b on the side of the light source 2 is approximately in parallel with the flat mirror-finish portions 11. Therefore, as illustrated in FIG. 19, the flexible reflective sheet 4 is in broad contact with the falling sloped surface 12b so that a region R with no air gap may be generated between the falling sloped surface 12b and the flexible reflective sheet 4. In the region R, the flexible reflective sheet 4 partly spreads light reflected at the falling sloped surface 12b, so that a so-called wet-out phenomenon inviting irregular patterns as illustrated in FIG. 20 may occur in the light emitting surface $S_{out}$ of the light guide plate 1, which would degrade the light distribution characteristics of the prism sheet 3 of FIG. 18.

SUMMARY

The presently disclosed subject matter seeks to solve one or more of the above-described problems.

According to the presently disclosed subject matter, in a light guide plate having a light incident surface, a light distributing control surface perpendicular to the light incident surface and a light emitting surface opposing the light distributing control surface, a flat mirror finishing portion is provided on a first area of the light distributing control surface, and a prism sequence is provided on a second area of the light distributing control surface where the flat mirror finishing portion is not provided. The prism sequence is protruded with respect to the flat mirror finishing portion. Each prism of the prism sequence has a rising sloped surface opposing the light incident surface, a first falling sloped surface connected to the rising sloped surface, and a second falling sloped surface connected to the first falling sloped surface. A slope of the first falling sloped surface is larger than a slope of the second falling sloped surface.

According to the presently disclosed subject matter, while the second falling sloped surface is not so sloped to improve the light distributing control efficiency, the first falling sloped surface is rapidly sloped, so that the angle between the first falling sloped surface and the rising sloped surface is reduced to form a sharper edge. As a result, when the light guide plate according to the presently disclosed subject matter is applied to a side-edge type surface-emission optical apparatus, the contact area between the light guide plate and the reflective sheet can be decreased to suppress the wet-out phenomenon.

BRIEF DESCRIPTION OF THE DRAWINGS

The above and other advantages and features of the presently disclosed subject matter will be more apparent from the following description of certain embodiments, taken in conjunction with the accompanying drawings, as compared with the prior art, wherein:

FIG. 14 is a cross-sectional view illustrating a modification of the side-edge type surface-emission optical apparatus of FIG. 12;

DETAILED DESCRIPTION OF EXEMPLARY EMBODIMENTS

Figure 1:
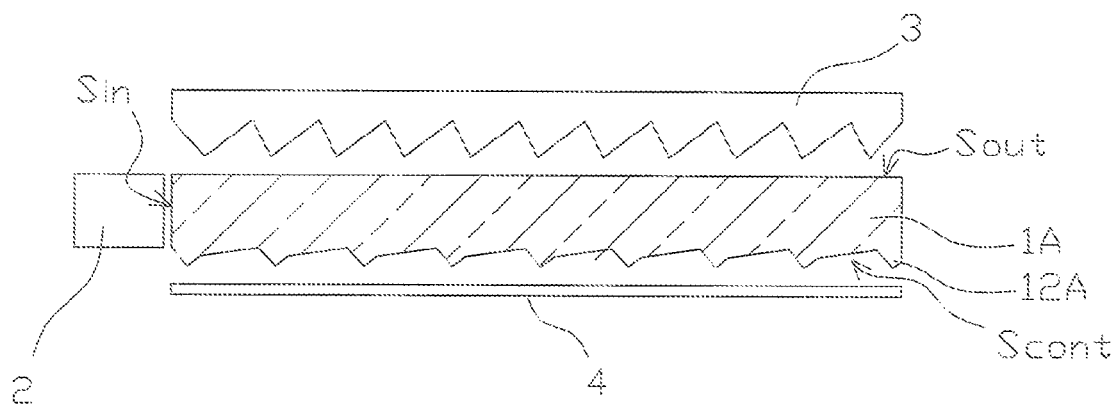
FIG. 1 is a cross-sectional view illustrating a side-edge type surface-emission optical apparatus including a first embodiment of the light guide plate according to the presently disclosed subject matter.
Figure 15A:
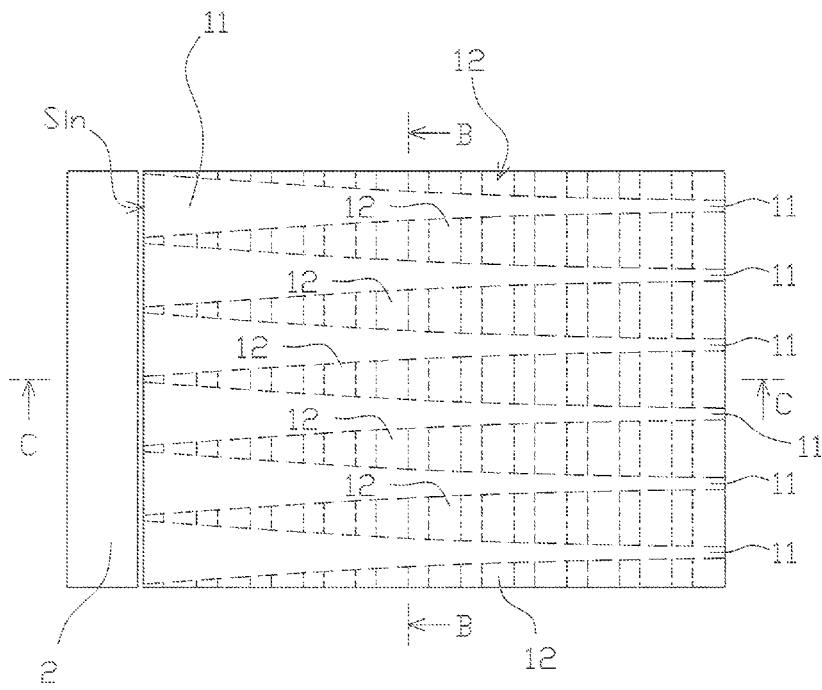
FIG. 15A is a plan view illustrating a prior art side-edge type surface-emission optical apparatus.
Figure 15B:
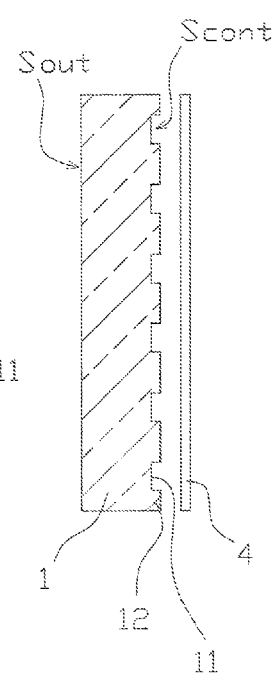
FIGS. 15B and 15C are cross-sectional views of the side-edge type surface-emission optical apparatus of FIG. 15A taken along the lines B-B and C-C, respectively, in FIG. 15A.
Figure 15C:
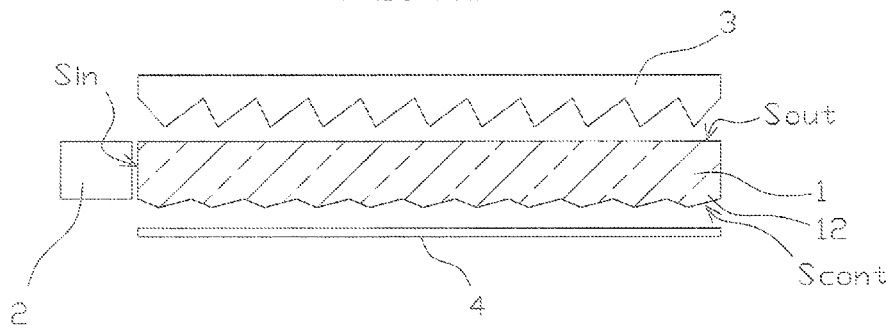

In FIG. 1, which is a cross-sectional view illustrating a side-edge type surface-emission optical apparatus including a first embodiment of the light guide plate according to the presently disclosed subject matter, the light guide plate 1 of FIGS. 15A, 15B and 15C is replaced by a light guide plate 1A whose triangular prism sequences 12A are different from the triangular prism sequences 12 of FIGS. 15A, 15B and 15C.

Figure 2:
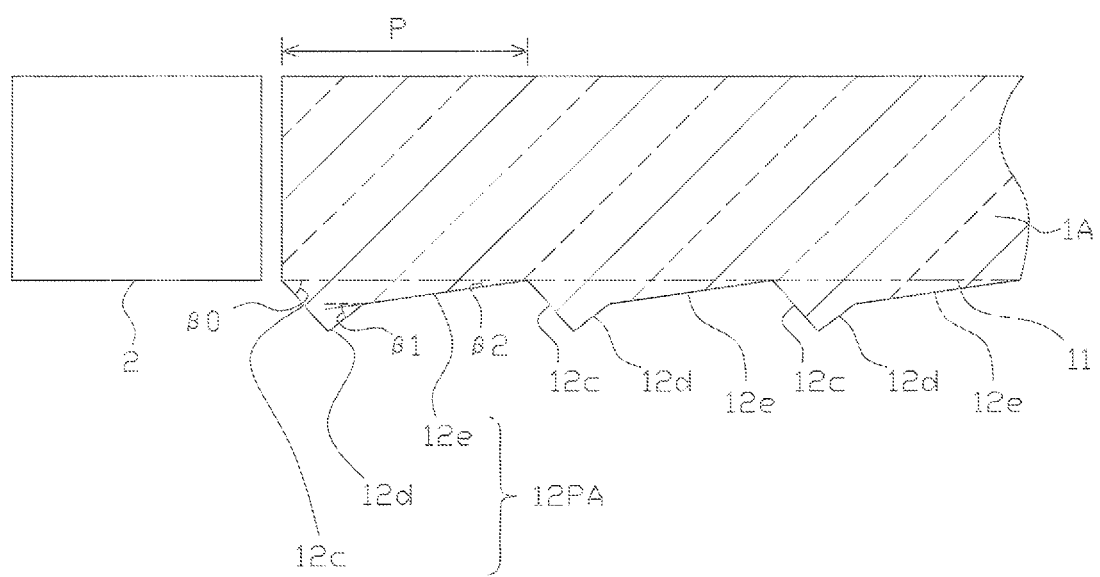
FIG. 2 is a partly enlarged cross-sectional view of the light guide plate of FIG. 1.

In FIG. 2, which is a partly-enlarged cross-sectional view of the light guide plate 1A of FIG. 1, each prism 12PA of the triangular prism sequences 12A per pitch P has an asymmetrical structure formed by a rising sloped surface 12c whose slope angle is defined by $\beta 0$, and two straight-type falling sloped surfaces 12d and 12e whose slope angles are defined by $\beta 1$ and $\beta 2$, respectively. The falling sloped surfaces 12d and 12e are straightly-sloped. In this case, the rising sloped surface 12c can be either straightly-sloped or concavedly-sloped (curvedly-sloped). The slope angle $\beta 1$ of the falling sloped surface 12d with respect to the flat mirror-finish portions 11 and the slope angle $\beta 2$ of the falling sloped surface 12e with respect to the flat mirror-finish portions 11 satisfy the following:

$$\beta 1 > \beta 2$$

Figure 16:
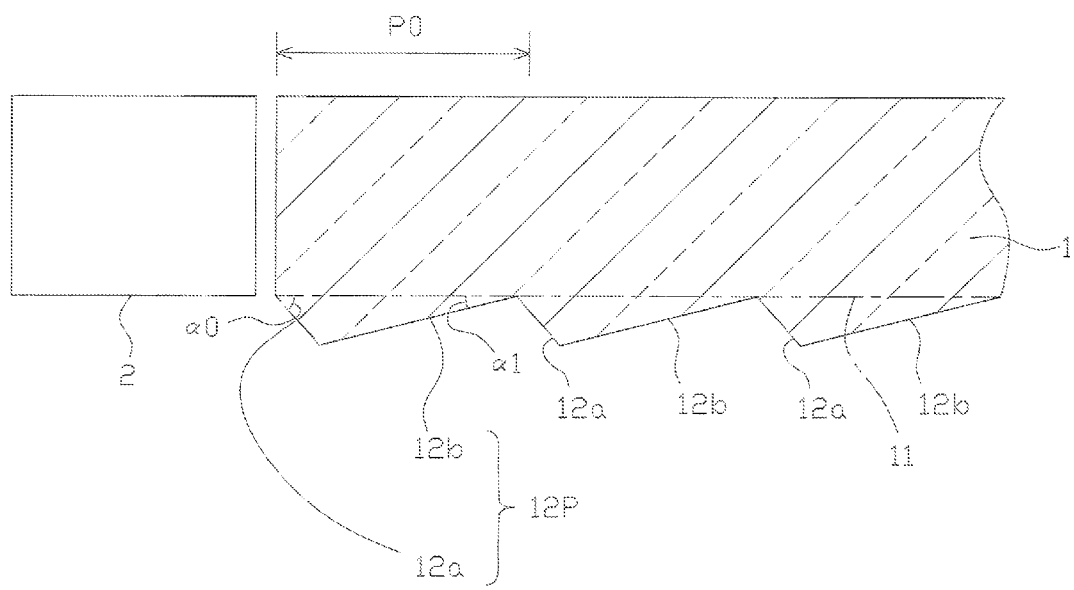
FIG. 16 is a partly-enlarged cross-sectional view of the light guide plate of FIGS. 15A, 15B and 15C.
Figure 17:
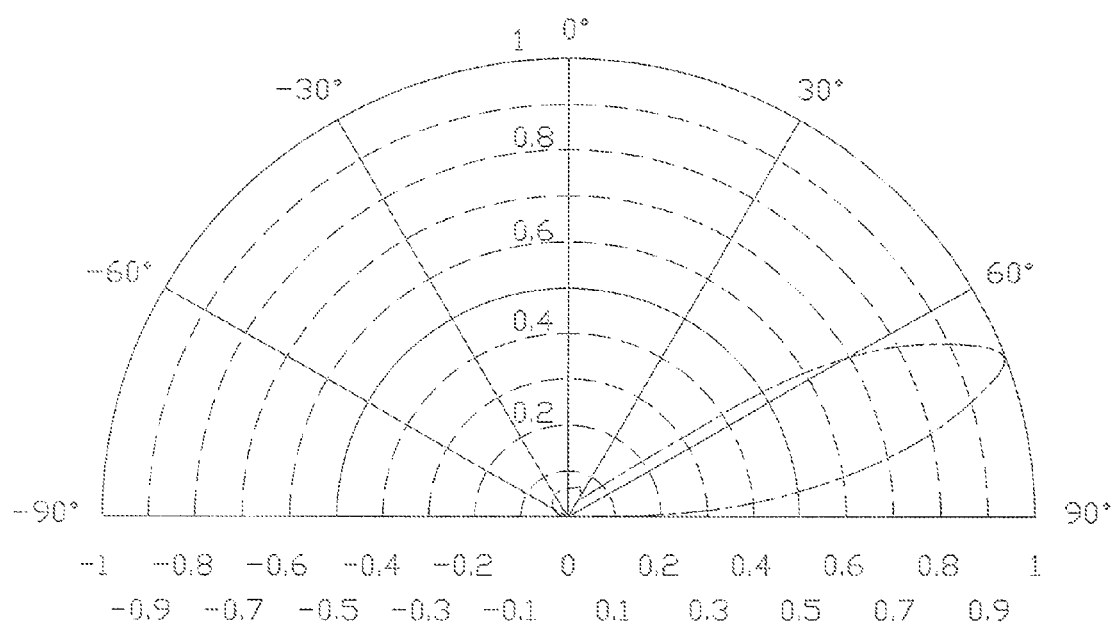
FIG. 17 is a graph illustrating spatial light distribution characteristics of the light guide plate of FIGS. 15A, 15B and 15C.
Figure 18:
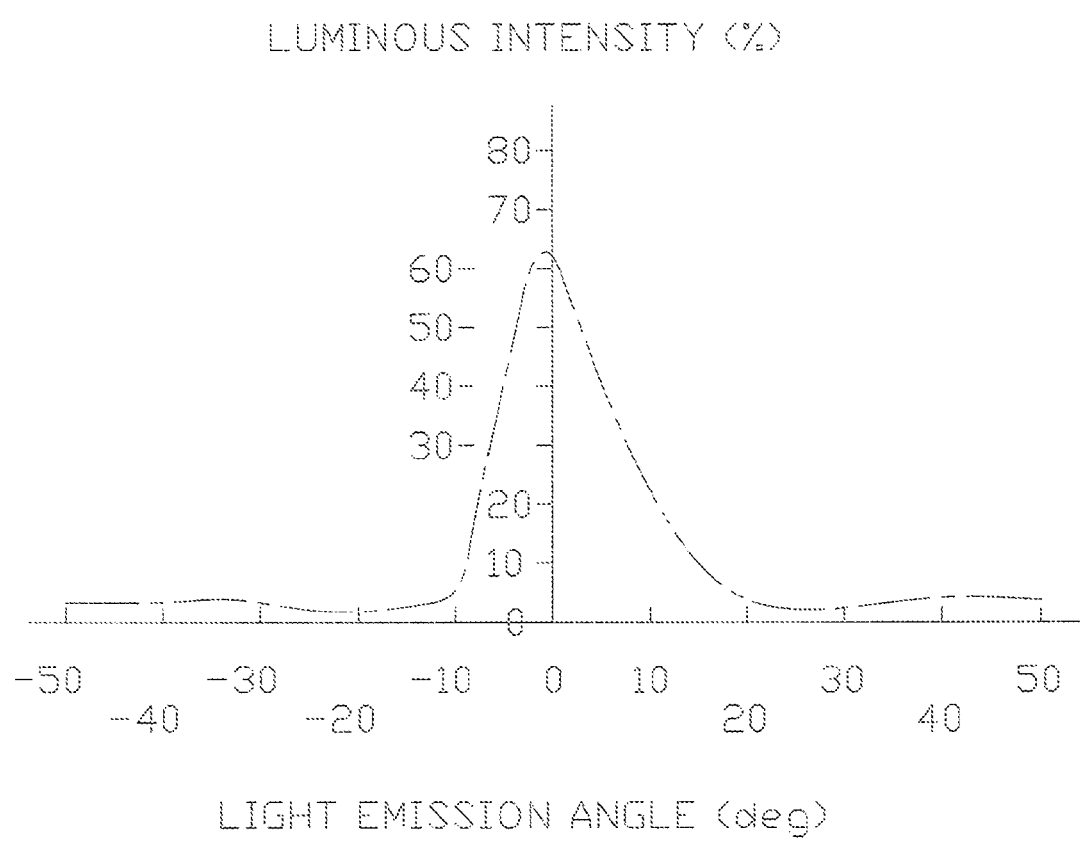
FIG. 18 is a graph illustrating light distribution characteristics of the prism sheet of FIGS. 15A, 15B and 15C.
Figure 19:
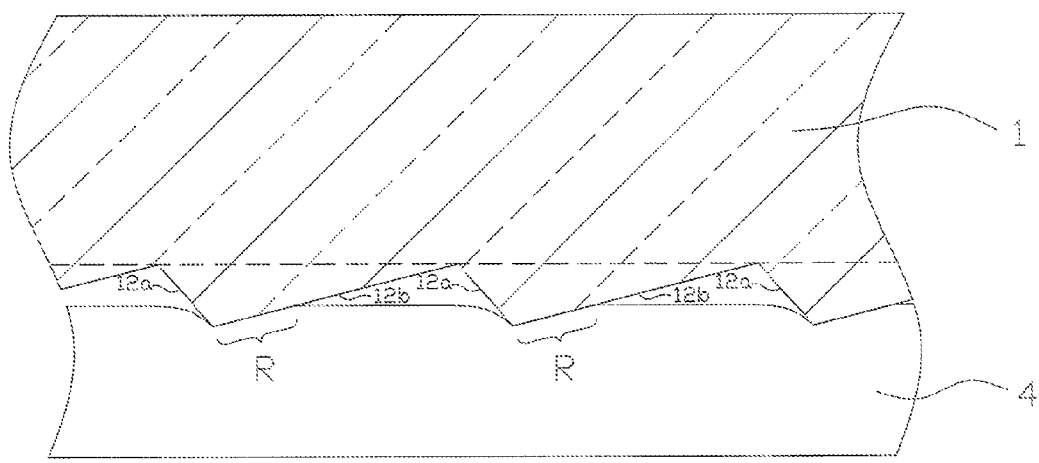
FIG. 19 is a cross-sectional view illustrating a contact state between the sloped surfaces of the light guide plate and the flexible reflective sheet of FIGS. 15A, 15B and 15C.
Figure 20:
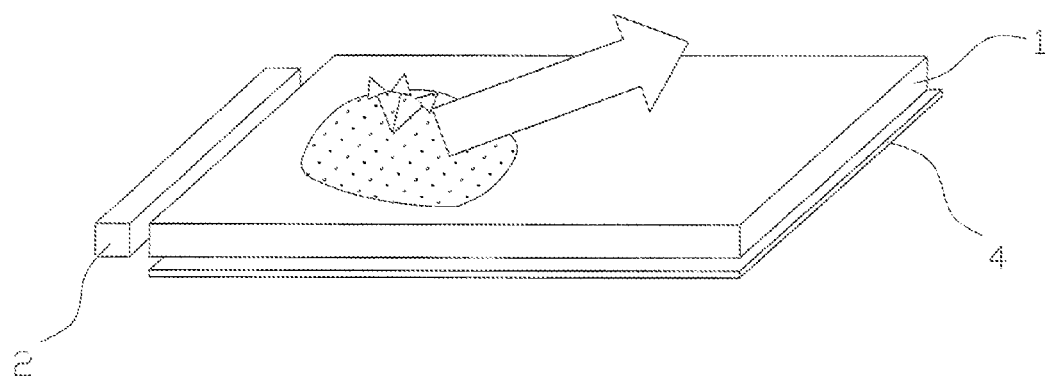
FIG. 20 is a perspective view for explaining the wet-out phenomenon in FIGS. 15A, 15B and 15C.

That is, the falling sloped surface 12d is more sloped than the falling sloped surface 12e. Thus, a sharper edge is formed by the rising sloped surface 12c and the falling sloped surface 12d. On the other hand, the slope angle $\beta 0$ of the rising sloped surface 12c with respect to the flat mirror finish portions 11 is the same as the slope angle $\alpha 0$ of FIG. 16, i.e., $$15° \leq \beta 0 \leq 90°$$

In FIG. 2, in order to suppress the wet-out phenomenon, the slope angle $\beta 1$ of the falling sloped surface 12d satisfies the following formula (1):

$$3° < \beta 1 < 8° \tag{1}$$

On the other hand, in order to enhance the light distributing control efficiency, the slope angle $\beta 2$ of the falling sloped surface 12e satisfies the following formula (2):

$$0.5° < \beta 2 < 3° \tag{2}$$

Further, the following formula (3) is satisfied:

$$2 \cdot S_{12d} \leq S_{12e} \leq 6 \cdot S_{12d} \tag{3}$$

where $S_{12d}$ is the area of the falling sloped surface 12d; and $S_{12e}$ is the area of the falling sloped surface 12e.

If $S_{12e}/2 \cdot S_{12d}$, the falling sloped surface 12d would adversely affect the light distributing control efficiency, to increase the full-width at half maximum of the spatial light distributing characteristics. On the other hand, if $S_{12e} > 6 \cdot S_{12d}$, the falling sloped surface 12d is increased to reduce the suppressing effect of the wet-out phenomenon.

Also, the pitch P of the prisms 12PA is $$15\ \mu m \leq P \leq 250\ \mu m$$

The minimum height of the falling sloped surface 12d is about 1 μm in order to sufficiently exhibit the suppressing effect of the wet-out phenomenon. In this case, the minimum value of the pitch P is about 15 μm. On the other hand, if the pitch P is larger than the maximum value 250 μm, each prism 12PA can be recognized as dots in the LCD unit.

Figure 3:
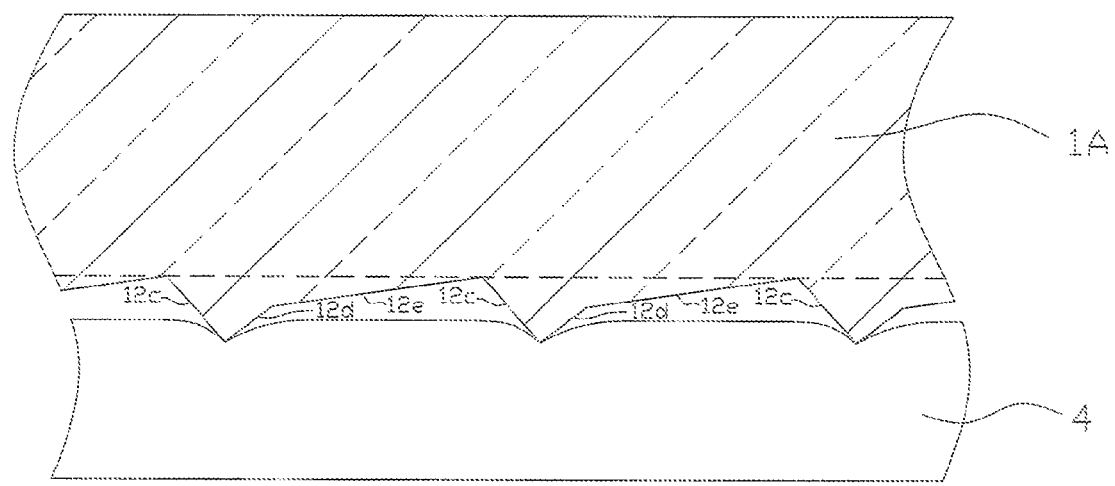
FIG. 3 is a cross-sectional view illustrating a contact state between the sloped surface of the light guide plate and the flexible reflective sheet of FIG. 1.

According to the first embodiment, as illustrated in FIG. 3, due to a sharper edge formed by the rising sloped surface 12c and the falling sloped surface 12d, the contact area between the flexible reflective sheet 4 and the rising sloped surface 12c as well as the contact area between the flexible reflective sheet 4 and the falling sloped surface 12d is reduced to suppress the wet-out phenomenon.

Figure 4:
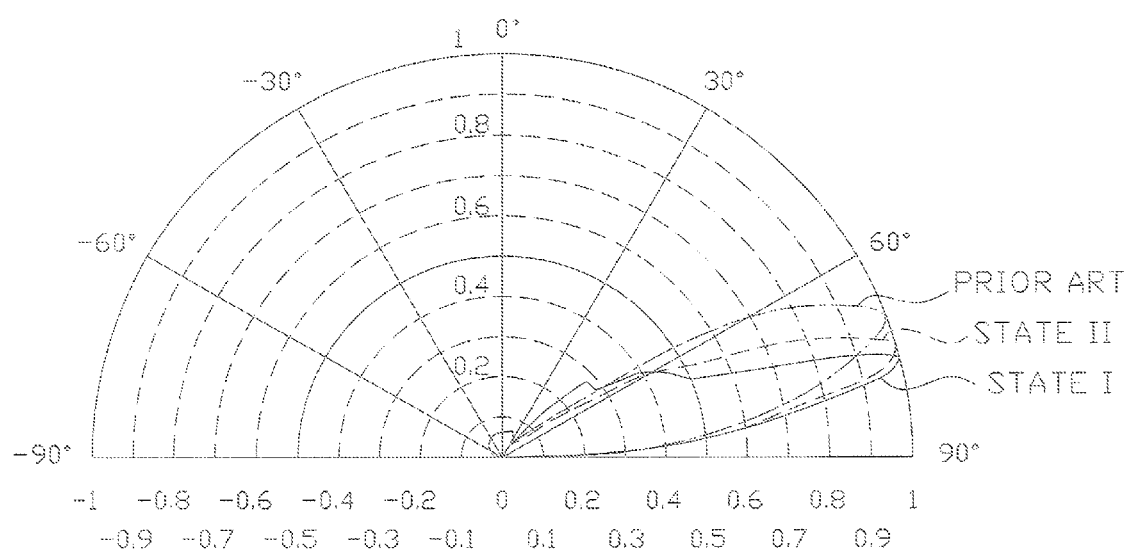
FIG. 4 is a graph illustrating proper states of the spatial light distribution characteristics of the light guide plate of FIG. 1.

In FIG. 4, which is a graph illustrating proper states of the spatial light distribution characteristics of the light guide plate 1A, a state I to satisfy the formulae (1), (2) and (3) is defined by $$\beta 1 = 7°$$

$$\beta 2 = 1°$$

$$S_{12e} = 5 \cdot S_{12d}$$

Also, a state II to satisfy the formulae (1), (2) and (3) is defined by $$\beta 1 = 4°$$

$$\beta 2 = 2°$$

$$S_{12e} = 2 \cdot S_{12d}$$

Figure 5:
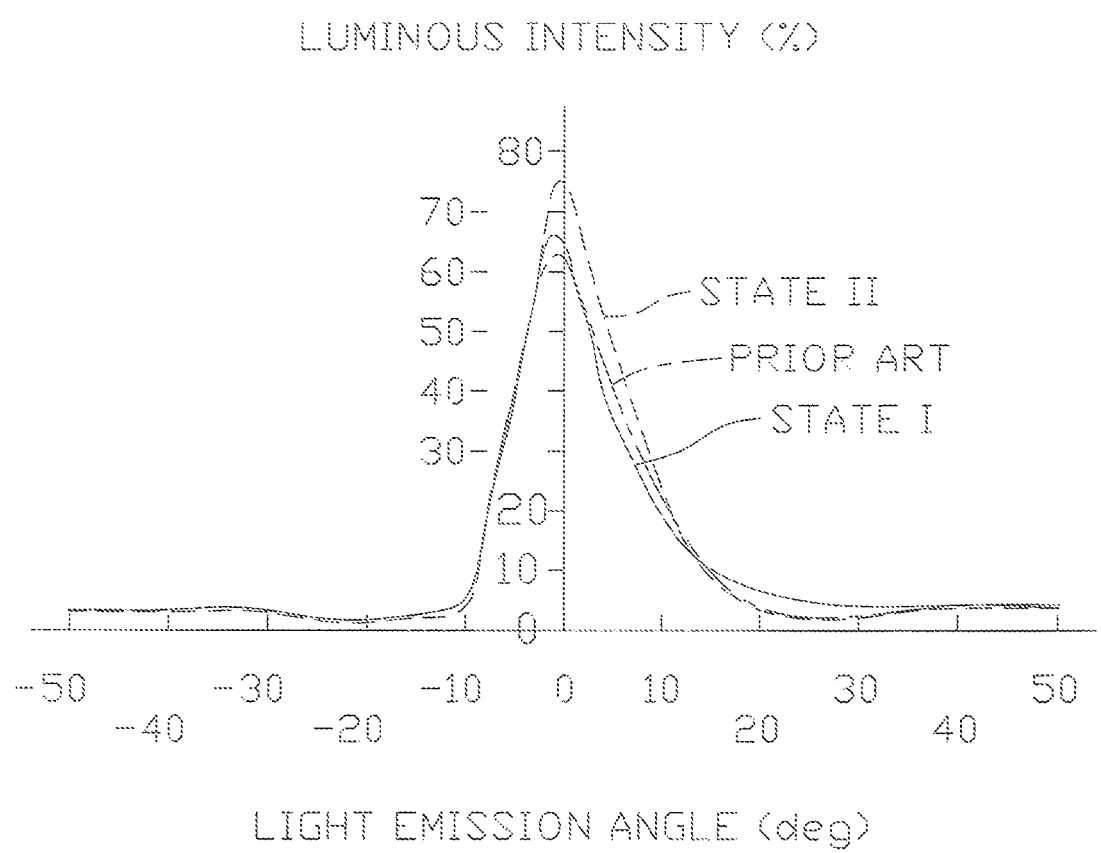
FIG. 5 is a graph illustrating proper states of the light distribution characteristics of the prism sheet of FIG. 1.

In the state I, the full-width at half maximum of the spatial light distribution characteristics of the light guide plate 1A as illustrated in FIG. 4 is reduced to 14° with a range from 68° to 82° as compared with the prior art where the full-width at half maximum is 25° with a range from 55° to 80°. As a result, as illustrated in FIG. 5, the luminous intensity of a surface-emission along the normal direction to the prism sheet 3 can be increased as compared with the prior art.

Also, in the state II, the full-width at half maximum of the spatial light distribution characteristics of the light guide plate 1A as illustrated in FIG. 4 is reduced to 18° with a range from 63° to 81° as compared with the prior art where the full-width at half maximum is 25° with a range from 55° to 80°. As a result, as illustrated in FIG. 5, the luminous intensity of a surface-emission along the normal direction to the prism sheet 3 can be increased as compared with the prior art.

Figure 6:
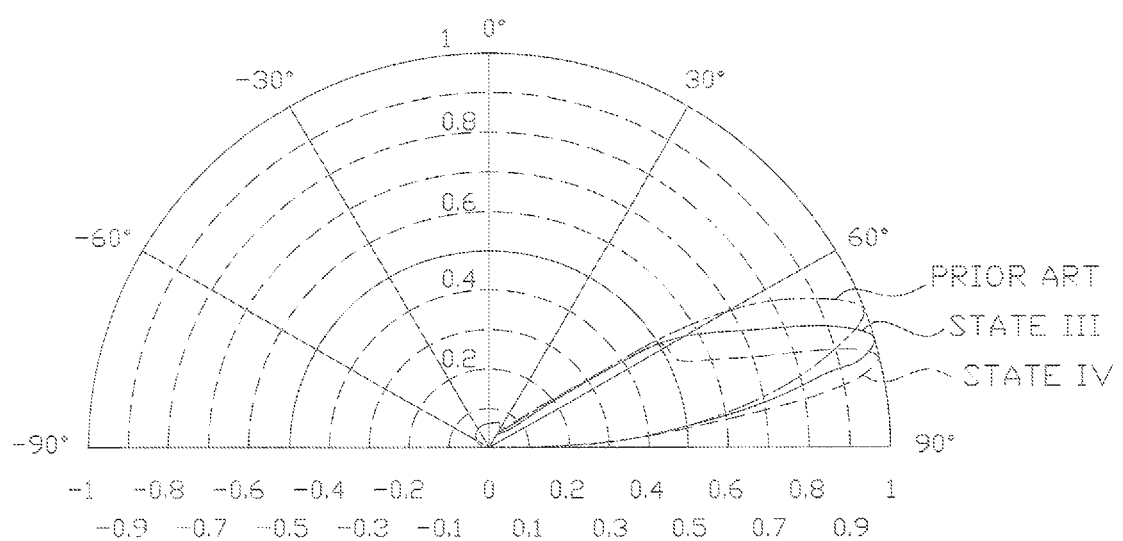
FIG. 6 is a graph illustrating improper states of the spatial light distribution characteristics of the light guide plate of FIG. 1.

In FIG. 6, which is a graph illustrating improper states of the spatial light distribution characteristics of the light guide plate 1A, a state III to satisfy the formulae (1) and (2) and not satisfy the formula (3) is defined by $$\beta 1 = 6°$$

$$\beta 2 = 2°$$

$$S_{12e} = 3 \cdot S_{12d}$$

Also, a state IV to satisfy the formulae (2) and (3) and not satisfy the formula (1) is defined by $$\beta 1 = 8°$$

$$\beta 2 = 1°$$

$$S_{12e} = 3 \cdot S_{12d}$$

Figure 7:
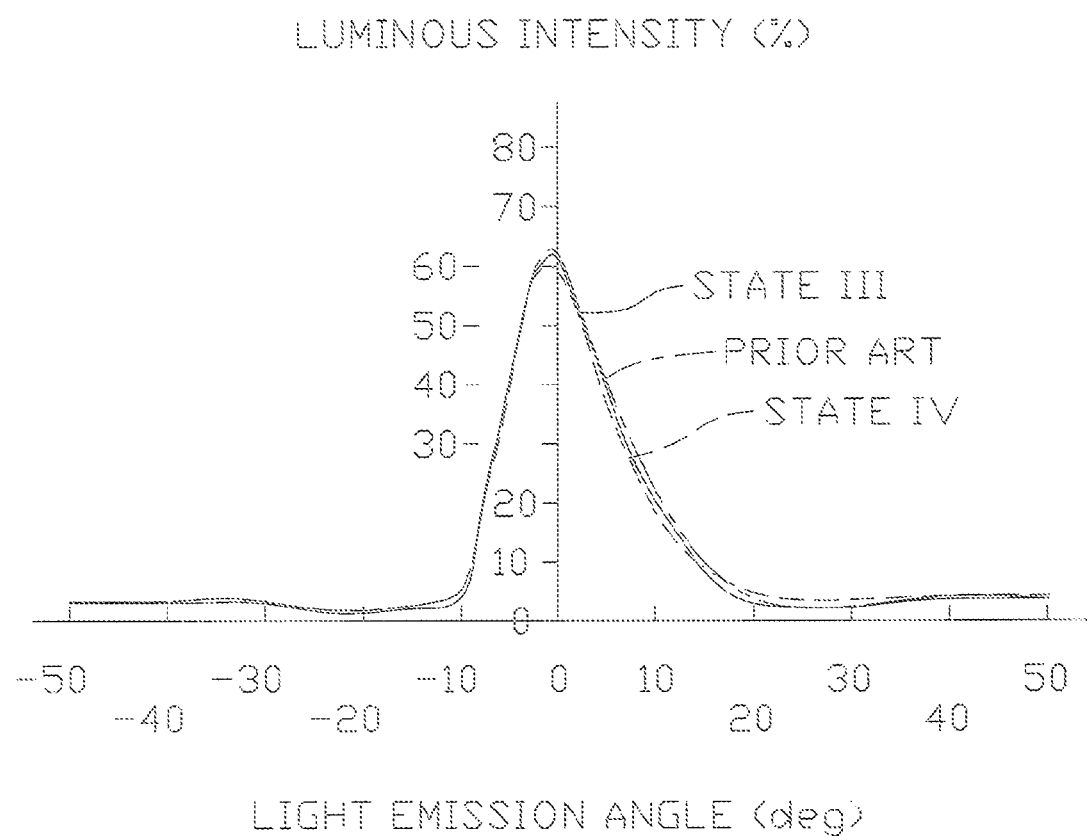
FIG. 7 is a graph illustrating improper states of the light distribution characteristics of the prism sheet of FIG. 1.

In the state III, the full-width at half maximum of the spatial light distribution characteristics of the light guide plate 1A as illustrated in FIG. 6 is 24° with a range from 56° to 80° which is almost the same as that of the prior art where the full-width at half maximum is 25° with a range from 55° to 80°. As a result, as illustrated in FIG. 7, the luminous intensity of a surface-emission along the normal direction to the prism sheet 3 is almost the same as that of the prior art.

Also, in the state IV, the full-width at half maximum of the spatial light distribution characteristics of the light guide plate 1A as illustrated in FIG. 6 is 23° with a range from 57° to 80° which is almost the same as that of the prior art where the full-width at half maximum is 25° with a range from 55° to 80°. As a result, as illustrated in FIG. 7, the luminous intensity of a surface-emission along the normal direction to the prism sheet 3 is almost the same as that of the prior art.

Figure 8:
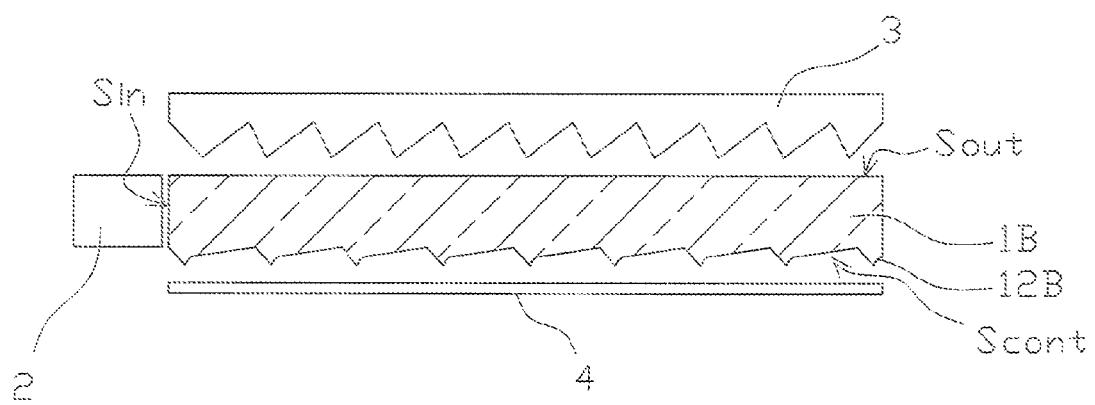
FIG. 8 is a cross-sectional view illustrating a side-edge type surface-emission optical apparatus including a second embodiment of the light guide plate according to the presently disclosed subject matter.

In FIG. 8, which is a cross-sectional view illustrating a side-edge type surface-emission optical apparatus including a second embodiment of the light guide plate according to the presently disclosed subject matter, the light guide plate 1A of FIG. 1 is replaced by a light guide plate 1B whose triangular prism sequences 12B are different from the triangular prism sequences 12A of FIG. 1.

Figure 9:
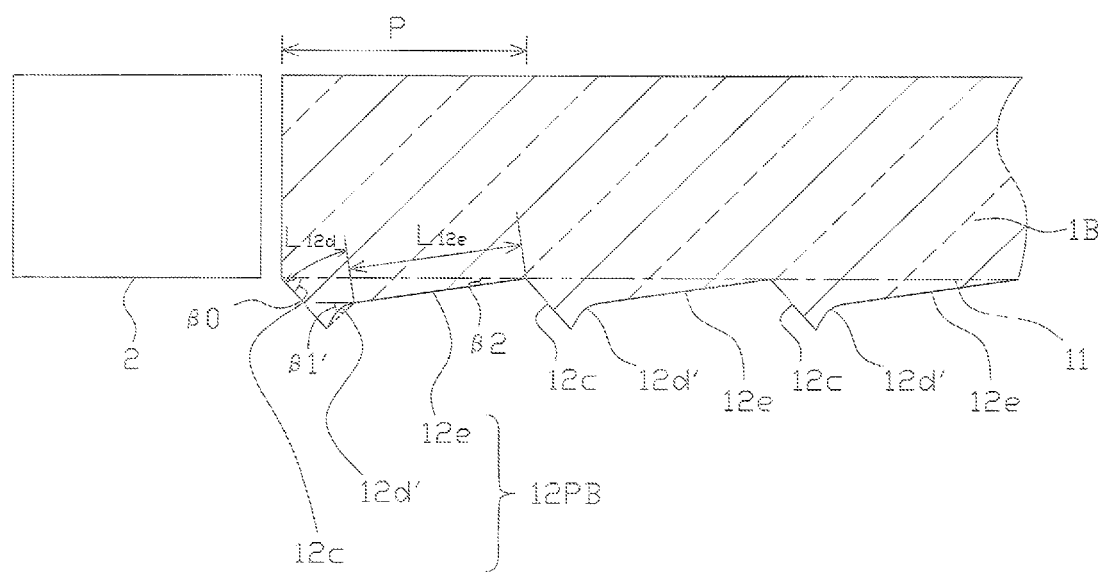
FIG. 9 is a partly-enlarged cross-sectional view of the light guide plate of FIG. 8.

In FIG. 9, which is a partly-enlarged cross-sectional view of the light guide plate 1B of FIG. 8, the straight-type falling sloped surface 12d of FIG. 2 is replaced by a concave-type falling sloped surface 12d'. The concave-type falling sloped surface 12d' is tangentially-curved and extended from the straight-type falling sloped surface 12e; however, the concave-type falling sloped surface 12d' is not always tangentially-curved. Also, the concave-type falling sloped surface 12d' is curvedly-sloped with one radius of curvature. In any case, the concave-type falling sloped surface 12d' is more sloped than the straight-type falling sloped surface 12e. Thus, a sharper edge is formed by the rising sloped surface 12c and the concaved-type falling sloped surface 12d'.

In FIG. 9, in order to suppress the wet-out phenomenon, the slope angle β1' of a line segment between the ends of the concave-type falling sloped surface 12d' satisfies the following formula (1') in the same way as the formula (1):

$$3° < \beta 1' < 8° \tag{1'}$$

On the other hand, in order to enhance the light distributing control efficiency, the slope angle β2 of the straight-type falling sloped surface 12e satisfies the following formula (2') in the same way as the formula (2):

$$0.5° < \beta 2 < 3° \tag{2'}$$

Further, the following formula (3') in the same way as the formula (3) is satisfied:

$$2 \cdot S_{12d}' \leq S_{12e} \leq 6 \cdot S_{12d}' \tag{3'}$$

where $S_{12d}'$ is the area of the concave-type falling sloped surface 12d'; and $S_{12e}$ is the area of the straight-type falling sloped surface 12e.

The formula (3') can be modified to the following formula:

$$2 \cdot L_{12d} \leq L_{12e} \leq 6 \cdot L_{12d}$$

where $L_{12d}$ is the length of the circular segment of a cross section of the concave-type falling sloped surface 12d'; and $L_{12e}$ is the length of the line segment of a cross section of the straight-type falling sloped surface 12e.

Also, since the minimum height of the concave-type falling sloped surface 12d' is about 1 μm to exhibit the suppressing effect of the wet-out phenomenon, the pitch P of the prisms 12PB is $$15\ \mu m \leq P \leq 250\ \mu m$$

Figure 10:
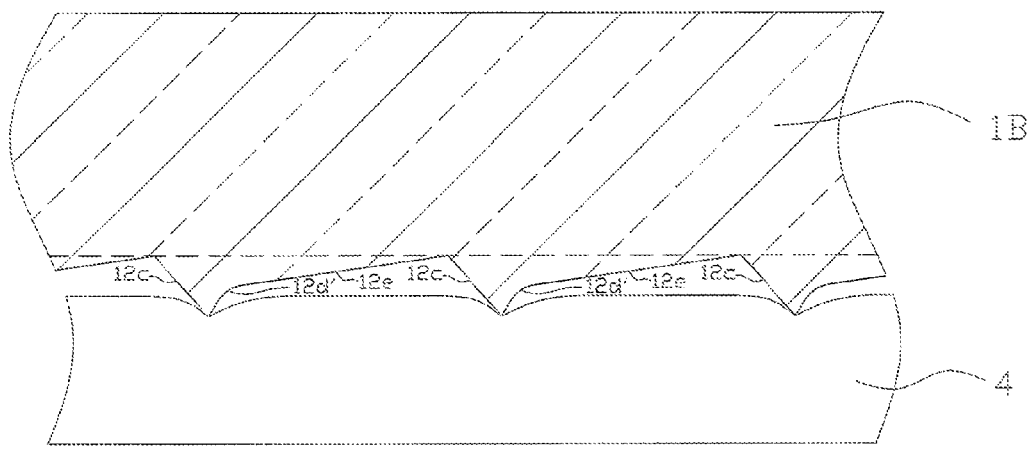
FIG. 10 is a cross-sectional view illustrating a contact state between the sloped surfaces of the light guide plate and the flexible reflective sheet of FIG. 8.

In the above-described second embodiment, since the straight-type falling sloped surface 12e is the same as that of the first embodiment, the light distributing control effect is the same as that of the first embodiment. However, since the slope angle β1' of the concave-type falling sloped surface 12d' is smaller than the slope angle β1 of the straight-type falling sloped surface 12d of the first embodiment to form a sharper edge by the rising sloped surface 12c and the falling sloped surface 12d', the contact area between the concave-type falling sloped surface 12d' and the flexible reflective sheet 4 is further decreased as illustrated in FIG. 10 to further improve the suppressing effect of the wet-out phenomenon.

Figure 11:
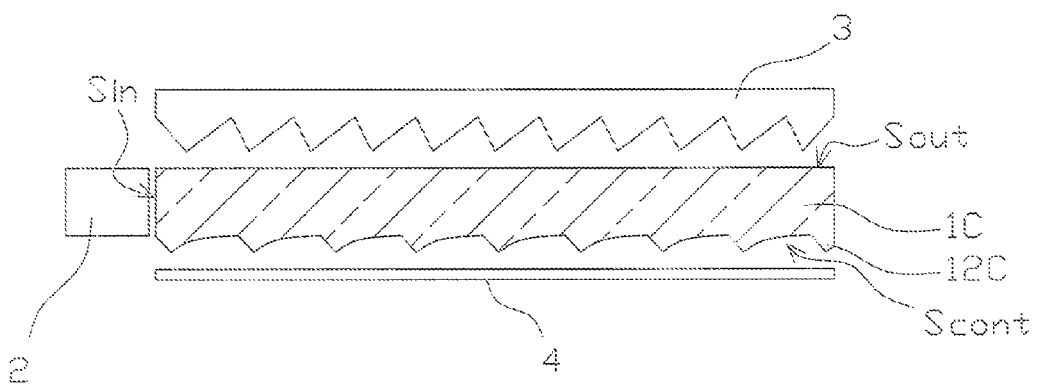
FIG. 11 is a cross-sectional view illustrating a side-edge type surface-emission optical apparatus including a third embodiment of the light guide plate according to the presently disclosed subject matter.

In FIG. 11, which is a cross-sectional view illustrating a side-edge type surface-emission optical apparatus including a third embodiment of the light guide plate according to the presently disclosed subject matter, the light guide plate 1A of FIG. 1 is replaced by a light guide plate 1C whose triangular prism sequences 12C are different from the triangular prism sequences 12A of FIG. 1.

Figure 12:
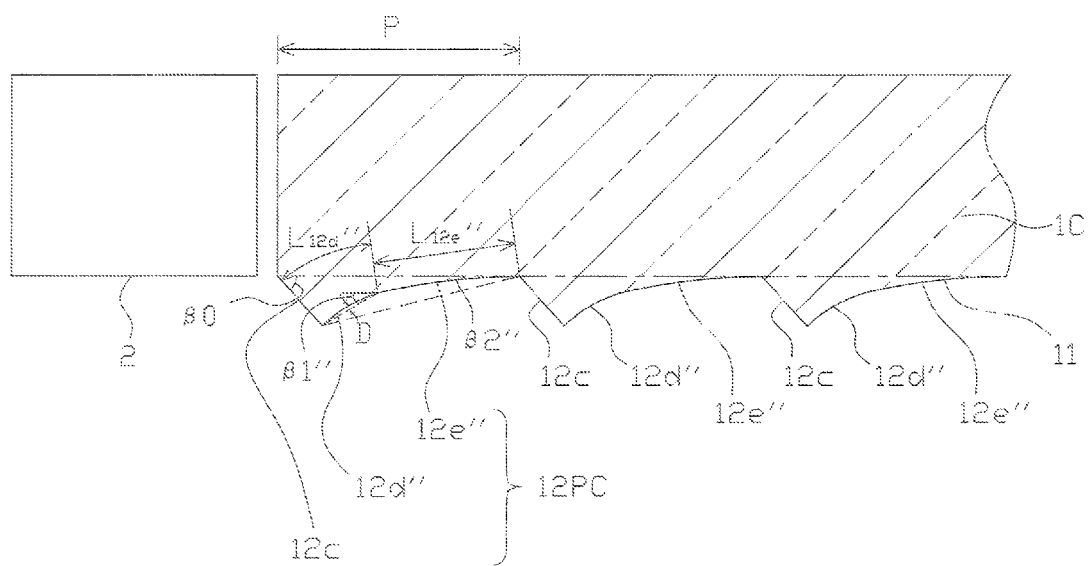
FIG. 12 is a partly-enlarged cross-sectional view of the light guide plate of FIG. 11.

In FIG. 12, which is a partly-enlarged cross-sectional view of the light guide plate 1C of FIG. 11, the straight-type falling sloped surface 12d of FIG. 2 is replaced by a concave-type falling sloped surface 12d". Also, the straight-type falling sloped surface 12d of FIG. 2 is replaced by a concave-type falling sloped surface 12e". Cross sections of the concave-type falling sloped surfaces 12d" and 12e" are curved. In this case, the radius of curvature of the concave-type falling sloped surface 12d" is smaller than that of the concave-type falling sloped surface 12e", so that the concave-type falling sloped surface 12d" is more sloped than the concave-type falling sloped surface 12e". Thus, a sharper edge is formed by the rising sloped surface 12c and the concave-type falling sloped surface 12d".

In FIG. 12, in order to suppress the wet-out phenomenon, the slope angle β1" of a line segment between the ends of the concave-type falling sloped surface 12d" satisfies the following formula (1") in the same way as the formula (1):

$$3° < β1" < 8° \quad (1")$$

On the other hand, in order to enhance the light distributing control efficiency, the slope angle β2 of a line segment between the ends of the concave-type falling sloped surface 12e" satisfies the following formula (2") in the same way as the formula (2):

$$0.5° < β2 < 3° \quad (2")$$

Further, the following formula (3") in the same way as the formula (3) is satisfied:

$$2 \cdot S_{12d}" \leq S_{12e}" \leq 6 \cdot S_{12d}" \quad (3")$$

where $S_{12d}"$ is the area of the concave-type falling sloped surface 12d"; and
$S_{12e}"$ is the area of the concave-type falling sloped surface 12e".

The formula (3") can be modified to the following formula:

$$2 \cdot L_{12d}" \leq L_{12e}" \leq 6 \cdot L_{12}"$$

where $L_{12d}"$ is the length of the circular segment between the ends of the concave-type falling sloped surface 12d"; and
$L_{12e}"$ is the length of the circular segment between the ends of the concave-type falling sloped surface 12e".

Further, a distance D between a center of the concave-type falling sloped surface 12d" and a center of the line segment of the concave-type falling sloped surface 12d" satisfies the following:

$$3/1000 \cdot L_{12d}" \leq D \leq 2/100 \cdot L_{12d}"$$

Still further, since the minimum height of the concave-type falling sloped surface 12d" is about 1 μm to exhibit the suppressing effect of the wet-out phenomenon, the pitch P of the prisms PC is $$15\ \mu m \leq P \leq 250\ \mu m$$

Figure 13:
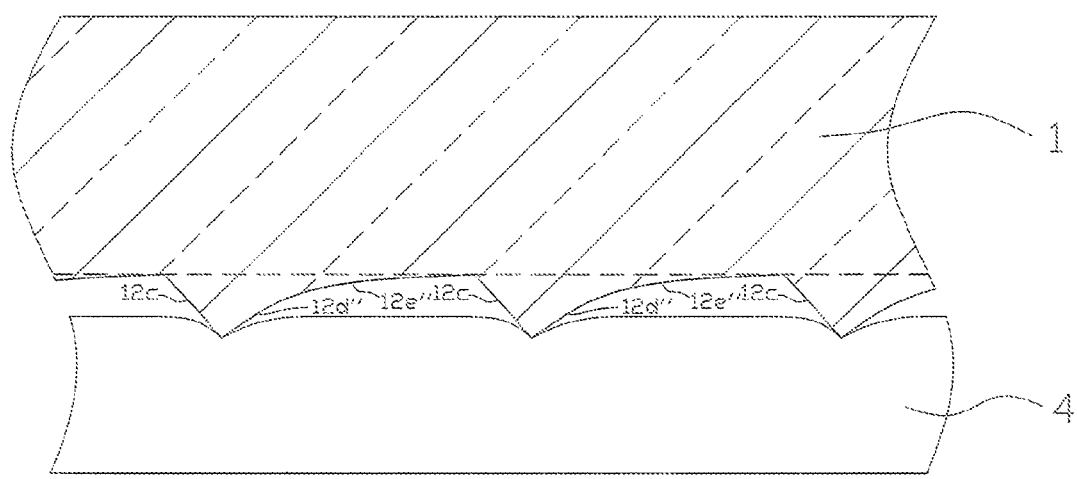
FIG. 13 is a cross-sectional view illustrating a contact state between the sloped surfaces of the light guide plate and the flexible reflective sheet of FIG. 11.

In the above-described third embodiment, since the concave-type falling sloped surface 12e is the same as that of the first embodiment, the light distributing control effect is the same as that of the first embodiment. However, since the angle between the rising sloped surface 12c and the concave-type falling sloped surface 12d" becomes smaller, the contact area between the concave-type falling sloped surface 12d" and the flexible reflective sheet 4 is further decreased as illustrated in FIG. 13 to further improve the suppressing effect of the wet-out phenomenon.

In FIG. 14, which illustrates a modification of the light guide plate 1C of FIG. 12, the concave-type falling sloped surfaces 12d" and 12e" are formed by a single concave-type falling sloped surface 12de whose concaved cross section has one radius of curvature. In this case, the farther from the light source 2 a location of the concave-type falling sloped surface 12de, the larger the slope of the concave-type falling sloped surface 12de. As a result, the contact area between the concave-type falling sloped surface 12de and the flexible reflective sheet 4 is decreased to further improve the suppressing effect of the wet-out phenomenon while maintaining the light distributing control effect due to the small slope of a part of the concave-type falling sloped surface 12de.

It will be apparent to those skilled in the art that various modifications and variations can be made in the presently disclosed subject matter without departing from the spirit or scope of the presently disclosed subject matter. Thus, it is intended that the presently disclosed subject matter covers the modifications and variations of the presently disclosed subject matter provided they come within the scope of the appended claims and their equivalents. All related or prior art references described above and in the Background portion of the present specification are hereby incorporated in their entirety by reference.

The invention claimed is:

1. A light guide plate having a light incident surface, a light distributing control surface perpendicular to said light incident surface and a light emitting surface opposing said light distributing control surface, comprising:
   a flat mirror-finish portion provided on a first area of said light distributing control surface; and
   a prism sequence provided on a second area of said light distributing control surface where said flat mirror-finish portion is not provided, said prism sequence being protruded with respect to said flat mirror-finish portion,
   wherein each prism of said prism sequence has a rising sloped surface opposing said light incident surface, a first falling sloped surface connected to said rising sloped surface, and a second falling sloped surface connected to said first falling sloped surface,
   a slope of said first falling sloped surface being larger than a slope of said second falling sloped surface,
   wherein each of said first and second falling sloped surfaces is straightly-sloped,
   wherein a slope angle β1 of said first falling sloped surface with respect to said flat mirror finishing portion satisfies:

$$3° < β1 < 8°,$$

wherein a slope angle β2 of said second falling sloped surface with respect to said flat mirror finishing portion satisfies:

$$0.5°<β2<3°, \text{ and}$$

wherein an area $S_{12d}$ of said first falling sloped surface and an area $S_{12e}$ of said second falling sloped surface satisfy:

$$2·S_{12d} \leq S_{12e} \leq 6·S_{12d}.$$

2. A light guide plate having a light incident surface, a light distributing control surface perpendicular to said light incident surface and a light emitting surface opposing said light distributing control surface, comprising:
- a flat mirror-finish portion provided on a first area of said light distributing control surface; and
- a prism sequence provided on a second area of said light distributing control surface where said flat mirror-finish portion is not provided, said prism sequence being protruded with respect to said flat mirror-finish portion,
- wherein each prism of said prism sequence has a rising sloped surface opposing said light incident surface, a first falling sloped surface connected to said rising sloped surface, and a second falling sloped surface connected to said first falling sloped surface,
- a slope of said first falling sloped surface being larger than a slope of said second falling sloped surface,
- wherein said first falling sloped surface is concavely-sloped and said second falling sloped surface is straightly-sloped.

3. The light guide plate as set forth in claim 2, wherein a slope angle β1' of a line segment between ends of said first falling sloped surface with respect to said flat mirror-finish portion satisfies:

$$3°<β1'<8°,$$

wherein a slope angle β2 of said second falling sloped surface with respect to said flat mirror-finish portion satisfies:

$$0.5°<β2<3°, \text{ and}$$

wherein an area $S_{12d}'$ of said first falling sloped surface and an area $S_{12e}$ of said second falling sloped surface satisfy:

$$2·S_{12d}' \leq S_{12e} \leq 6·S_{12d}'.$$

4. A light guide plate having a light incident surface, a light distributing control surface perpendicular to said light incident surface and a light emitting surface opposing said light distributing control surface, comprising:
- a flat mirror-finish portion provided on a first area of said light distributing control surface; and
- a prism sequence provided on a second area of said light distributing control surface where said flat mirror-finish portion is not provided, said prism sequence being protruded with respect to said flat mirror-finish portion,
- wherein each prism of said prism sequence has a rising sloped surface opposing said light incident surface, a first falling sloped surface connected to said rising sloped surface, and a second falling sloped surface connected to said first falling sloped surface,
- a slope of said first falling sloped surface being larger than a slope of said second falling sloped surface,
- wherein each of said first and second falling sloped surfaces is concavely-sloped.

5. The light guide plate as set forth in claim 4, wherein a slope angle β1" of a line segment between ends of said first falling sloped surface with respect to said flat mirror finishing portion satisfies:

$$3°<β1"<8°,$$

wherein a slope angle β2" of a line segment between ends of said second falling sloped surface with respect to said flat mirror finishing portion satisfies:

$$0.5°<β2"<3°, \text{ and}$$

wherein an area $S_{12d}"$ of said first falling sloped surface and an area $S_{12e}"$ of said second falling sloped surface satisfy:

$$2·S_{12d}" \leq S_{12e}" \leq 6·S_{12d}".$$

6. The light guide plate as set forth in claim 4, wherein said first and second falling sloped surfaces form one curved-type falling sloped surface where the nearer to said light incident surface a location of said curved-type falling sloped surface, the larger the slope of said curved-type falling sloped surface at that location.

7. A side-edge type surface-emission optical apparatus comprising:
- a light guide plate having a light incident surface, a light distributing control surface perpendicular to said light incident surface and a light emitting surface opposing said light distributing control surface;
- a light source disposed on a side of said light incident surface of said light guide plate;
- a prism sheet disposed on a side of said light emitting surface of said light guide plate; and
- a reflective sheet disposed on a side of the light distributing control surface of said light guide plate,
- said light guide plate comprising:
- a flat mirror-finish portion provided on a first area of said light distributing control surface; and
- a prism sequence provided on a second area of said light distributing control surface where said flat mirror-finish portion is not provided, said prism sequence being protruded with respect to said flat mirror-finish portion,
- wherein each prism of said prism sequence has a rising sloped surface opposing said light incident surface, a first falling sloped surface connected to said rising sloped surface, and a second falling sloped surface connected to said first falling sloped surface,
- a slope of said first falling sloped surface being larger than a slope of said second falling sloped surface,
- wherein each of said first and second falling sloped surfaces is straightly-sloped,
- wherein a slope angle β1 of said first falling sloped surface with respect to said flat mirror-finish portion satisfies:

$$3°<β1<8°,$$

wherein a slope angle β2 of said second falling sloped surface with respect to said flat mirror-finish portion satisfies:

$$0.5°<β2<3°, \text{ and}$$

wherein an area $S_{12d}$ of said first falling sloped surface and an area $S_{12e}$ of said second falling sloped surface satisfy:

$$2·S_{12d} \leq S_{12e} \leq 6·S_{12d}.$$

8. A side-edge type surface-emission optical apparatus comprising:
- a light guide plate having a light incident surface, a light distributing control surface perpendicular to said light incident surface and a light emitting surface opposing said light distributing control surface;
- a light source disposed on a side of said light incident surface of said light guide plate;

a prism sheet disposed on a side of said light emitting surface of said light guide plate; and a reflective sheet disposed on a side of the light distributing control surface of said light guide plate, said light guide plate comprising:

a flat mirror-finish portion provided on a first area of said light distributing control surface; and a prism sequence provided on a second area of said light distributing control surface where said flat mirror-finish portion is not provided, said prism sequence being protruded with respect to said flat mirror-finish portion, wherein each prism of said prism sequence has a rising sloped surface opposing said light incident surface, a first falling sloped surface connected to said rising sloped surface, and a second falling sloped surface connected to said first falling sloped surface, a slope of said first falling sloped surface being larger than a slope of said second falling sloped surface, wherein said first falling sloped surface is concavely-sloped and said second falling sloped surface is straightly-sloped.

9. The side-edge type surface-emission optical apparatus as set forth in claim 8, wherein a slope angle $\beta1'$ of a line segment between ends of said first falling sloped surface with respect to said flat mirror-finish portion satisfies:

$$3° < \beta1' < 8°,$$

wherein a slope angle $\beta2$ of said second falling sloped surface with respect to said flat mirror-finish portion satisfies:

$$0.5° < \beta2 < 3°, \text{ and}$$

wherein an area $S_{12d}'$ of said first falling sloped surface and an area $S_{12e}$ of said second falling sloped surface satisfy:

$$2 \cdot S_{12d}' \leq S_{12e} \leq 6 \cdot S_{12d}'.$$

10. A side-edge type surface-emission optical apparatus comprising:

a light guide plate having a light incident surface, a light distributing control surface perpendicular to said light incident surface and a light emitting surface opposing said light distributing control surface;

a light source disposed on a side of said light incident surface of said light guide plate;

a prism sheet disposed on a side of said light emitting surface of said light guide plate; and a reflective sheet disposed on a side of the light distributing control surface of said light guide plate, said light guide plate comprising:

a flat mirror-finish portion provided on a first area of said light distributing control surface; and a prism sequence provided on a second area of said light distributing control surface where said flat mirror-finish portion is not provided, said prism sequence being protruded with respect to said flat mirror-finish portion, wherein each prism of said prism sequence has a rising sloped surface opposing said light incident surface, a first falling sloped surface connected to said rising sloped surface, and a second falling sloped surface connected to said first falling sloped surface, a slope of said first falling sloped surface being larger than a slope of said second falling sloped surface, wherein each of said first and second falling sloped surfaces is concavely-sloped.

11. The side-edge type surface-emission optical apparatus as set forth in claim 10, wherein a slope angle $\beta1''$ of a line segment between ends of said first falling sloped surface with respect to said flat mirror-finish portion satisfies:

$$3° < \beta1'' < 8°,$$

wherein a slope angle $\beta2''$ of a line segment between ends of said second falling sloped surface with respect to said flat mirror-finish portion satisfies:

$$0.5° < \beta2'' < 3°, \text{ and}$$

wherein an area $S_{12d}''$ of said first falling sloped surface and an area $S_{12e}''$ of said second falling sloped surface satisfy:

$$2 \cdot S_{12d}'' \leq S_{12e}'' \leq 6 \cdot S_{12d}''.$$

12. The side-edge type surface-emission optical apparatus as set forth in claim 10, wherein said first and second falling sloped surfaces form one curved-type falling sloped surface where the nearer to said light incident surface a location of said curved-type falling sloped surface, the larger the slope of said curved-type falling sloped surface at that location.

* * * * *